(12) United States Patent
Gong et al.

(10) Patent No.: US 11,146,372 B2
(45) Date of Patent: Oct. 12, 2021

(54) REFERENCE SIGNAL TRANSMISSION METHOD AND APPARATUS

(71) Applicant: Huawei Technologies Co., Ltd., Shenzhen (CN)

(72) Inventors: Zhengwei Gong, Shanghai (CN); Xiaojun Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 145 days.

(21) Appl. No.: 16/402,870

(22) Filed: May 3, 2019

(65) Prior Publication Data

US 2019/0260543 A1 Aug. 22, 2019

Related U.S. Application Data

(63) Continuation of application No. PCT/CN2017/109366, filed on Nov. 3, 2017.

(30) Foreign Application Priority Data

Nov. 4, 2016 (CN) .......................... 201610965398.1

(51) Int. Cl.
*H04L 5/00* (2006.01)
*H04W 24/10* (2009.01)
(Continued)

(52) U.S. Cl.
CPC .......... *H04L 5/0051* (2013.01); *H04L 1/0026* (2013.01); *H04L 25/0226* (2013.01);
(Continued)

(58) Field of Classification Search
CPC .... H04J 11/0023; H04J 11/00; H04J 11/0053; H04J 11/0056; H04L 25/0226;
(Continued)

(56) References Cited

U.S. PATENT DOCUMENTS

| 2012/0140652 | A1 | 6/2012 | Pan et al. | |
|---|---|---|---|---|
| 2012/0208547 | A1* | 8/2012 | Geirhofer | H04L 5/0032 455/452.2 |
| 2013/0329660 | A1* | 12/2013 | Noh | H04L 27/2613 370/329 |
| 2014/0064203 | A1* | 3/2014 | Seo | H04L 1/1854 370/329 |

(Continued)

FOREIGN PATENT DOCUMENTS

| CA | 2900236 A1 | 5/2008 |
|---|---|---|
| CN | 101867964 A | 10/2010 |

(Continued)

*Primary Examiner* — Awet Haile
(74) *Attorney, Agent, or Firm* — Leydig, Voit & Mayer, Ltd.

(57) ABSTRACT

A reference signal transmission method and apparatus are provided. The method includes: receiving, by a first terminal, uplink reference signal configuration information from a base station, wherein the uplink reference signal configuration information comprises configuration information of a first-type reference signal and configuration information of a second-type reference signal that the first terminal needs to send; and sending, by the first terminal, a first-type reference signal and a second-type reference signal to the base station based on the uplink reference signal configuration information. The method can be applied for V2X (vehicle to X), and/or, sidelink transmission, and/or, D2D (device to device) communication.

14 Claims, 7 Drawing Sheets

(51) Int. Cl.
   *H04L 1/00*      (2006.01)
   *H04L 25/02*     (2006.01)
   *H04L 27/26*     (2006.01)
   *H04W 72/08*     (2009.01)
   *H04W 72/12*     (2009.01)

(52) U.S. Cl.
   CPC ......... *H04L 27/2607* (2013.01); *H04W 24/10* (2013.01); *H04W 72/082* (2013.01); *H04W 72/12* (2013.01); *H04W 72/085* (2013.01)

(58) Field of Classification Search
   CPC . H04L 25/0228; H04L 5/0032; H04L 5/0073; H04L 5/0092; H04W 72/042; H04W 24/10; H04W 72/048; H04W 72/085; H04W 72/12; H04B 7/0626; H04B 7/024
   See application file for complete search history.

(56) References Cited

U.S. PATENT DOCUMENTS

| | | | |
|---|---|---|---|
| 2014/0315541 A1* | 10/2014 | Lu | H04W 24/10 455/426.1 |
| 2015/0038135 A1* | 2/2015 | Lu | H04L 5/005 455/426.1 |
| 2017/0013489 A1* | 1/2017 | Seo | H04W 24/08 |
| 2018/0062724 A1* | 3/2018 | Onggosanusi | H04B 7/0413 |
| 2021/0022044 A1* | 1/2021 | Zhang | H04L 27/2636 |

FOREIGN PATENT DOCUMENTS

| | | |
|---|---|---|
| EP | 2793414 A1 | 10/2014 |
| EP | 2826285 B1 | 5/2019 |
| WO | 2015154934 A1 | 10/2015 |
| WO | 2015154935 A1 | 10/2015 |

\* cited by examiner

Time-frequency pattern 1    Time-frequency pattern 2

REFERENCE SIGNAL TRANSMISSION METHOD AND APPARATUS

CROSS REFERENCE TO RELATED APPLICATION

This application is a continuation of International Application No. PCT/CN2017/109366, filed on Nov. 3, 2017, which claims priority to Chinese Patent Application No. 201610965398.1, filed on Nov. 4, 2016. The disclosures of the aforementioned applications are hereby incorporated by reference in their entireties.

TECHNICAL FIELD

The present disclosure relates to the field of wireless communications technologies, and in particular, to a reference signal transmission method and apparatus.

BACKGROUND

A full duplex technology means that a node on a same time-frequency resource can support simultaneous sending and receiving of signals. To improve spectral efficiency, a base station may provide a service for a terminal by using the full duplex technology. Currently, when the full duplex technology is applied to a process of communication between the base station and the terminal, the base station side may implement full duplex, that is, the base station may simultaneously send downlink data and receive uplink data through a same channel. If the terminal side uses the full duplex technology, strong interference may be caused between terminals. Therefore, the terminal side uses half duplex, that is, the terminal may receive and send data by using one channel, and the terminal can only send data or receive data on the channel at a time, that is, cannot receive and send data simultaneously.

However, in a process in which the base station communicates with the terminal by using the full duplex technology, there may be a case in which the terminal sends data to the base station and another terminal receives data sent by the base station at the same time. Alternatively, for two adjacent base stations, there may be a case in which some terminals at a cell edge send data to first base stations and another terminal at a cell edge receives data sent by a second base station at the same time, and an uplink signal sent by the terminal to the base station causes interference to a downlink signal sent by the base station to the another terminal.

SUMMARY

Embodiments of the present disclosure provide a reference signal transmission method and apparatus, so as to resolve a problem that an uplink signal sent by a terminal to a base station causes interference to a downlink signal sent by the base station to another terminal when the base station communicates in full duplex mode.

To achieve the foregoing objective, the embodiments of the present disclosure use the following technical solutions:

According to a first aspect, an embodiment of the present disclosure provides a reference signal transmission method, including: sending, by a base station, uplink reference signal configuration information to a first terminal; receiving, by the base station, an uplink reference signal sent by the first terminal based on the uplink reference signal configuration information; and sending, by the base station, downlink reference signal configuration information to a second terminal; where the uplink reference signal configuration information includes configuration information of a first-type reference signal, the downlink reference signal configuration information includes the configuration information of the first-type reference signal and configuration information of a second-type reference signal that the base station needs to send to the second terminal; or the uplink reference signal configuration information includes configuration information of a first-type reference signal and configuration information of a second-type reference signal that the first terminal needs to send, and the downlink reference signal configuration information includes configuration information of a second-type reference signal that the base station needs to send to the second terminal and configuration information of a second-type reference signal that the first terminal needs to send to the base station. It can be learned that, in this solution, the base station separately sends the uplink reference signal configuration information to the first terminal, and sends the downlink reference signal configuration information to the second terminal, so that, after the second terminal receives the downlink reference signal configuration information, the second terminal can not only measure the downlink reference signal sent by the base station to the second terminal, but also measure the uplink reference signal sent by the first terminal to the base station. Therefore, the base station can determine, based on a measurement result, interference, caused by the uplink signal sent by the first terminal to the base station, to the downlink signal sent by the base station to the second terminal, so that the base station can perform coordinated scheduling on the first terminal and the second terminal based on the measurement result to eliminate interference between the terminals.

According to another aspect, an embodiment of the present disclosure provides a reference signal transmission method, including: receiving, by a first terminal, uplink reference signal configuration information sent by a base station, and then sending a first-type reference signal and a second-type reference signal to the base station based on the uplink reference signal configuration information, where the uplink reference signal configuration information includes configuration information of a first-type reference signal and configuration information of a second-type reference signal that the first terminal needs to send. It can be learned that, the first terminal may send an uplink reference signal based on the uplink reference signal distribution information configured by the terminal, so that the base station may specify that the second terminal may measure the uplink reference signal sent by the first terminal, and then may determine, based on a measurement result, interference, caused by the uplink signal sent by the first terminal to the base station, to the downlink signal sent by the base station to the second terminal, so that the base station can eliminate the interference based on the measurement result.

According to another aspect, an embodiment of the present disclosure further provides a reference signal transmission method, including: receiving, by a second terminal, downlink reference signal configuration information sent by a base station, and then performing downlink measurement based on the downlink reference signal configuration information. The downlink reference signal configuration information includes configuration information of a first-type reference signal and configuration information of a second-type reference signal that the base station needs to send to the second terminal; or the downlink reference signal configuration information includes configuration information of a second-type reference signal that the base station needs to send to the second terminal and configuration information of a second-type reference signal that a first terminal needs to send to the base station. It can be learned that, the second terminal may perform measurement based on the downlink reference signal configuration information sent by the base station. This is equivalent to that the base station may specify that the second terminal not only measures the downlink reference signal sent by the base station to the second terminal, but also measures the uplink reference signal sent by the first terminal to the base station, so as to perform coordinated scheduling on the first terminal and the second terminal based on a measurement result to eliminate interference between the terminals.

In a possible design, a method in which the second terminal performs downlink measurement based on the downlink reference signal configuration information is as follows: When the downlink reference signal configuration information includes the configuration information of the first-type reference signal and the configuration information of the second-type reference signal sent by the base station to the second terminal, the second terminal separately performs downlink measurement on the first-type reference signal sent by the first terminal and the second-type reference signal sent by the base station to the second terminal; or when the downlink reference signal configuration information includes the configuration information of the second-type reference signal sent by the base station to the second terminal and the configuration information of the second-type reference signal sent by the first terminal to the base station, the second terminal separately performs downlink measurement on the second-type reference signal sent by the first terminal and the second-type reference signal sent by the base station to the second terminal.

According to another aspect, an embodiment of the present disclosure provides a reference signal transmission method, including: sending, by a first base station, uplink reference signal configuration information to a first terminal served by the first base station; sending, by the first terminal, an uplink reference signal to the first base station based on the uplink reference signal configuration information; and sending, by a second base station, downlink reference signal configuration information to a second terminal served by the second base station; where the uplink reference signal configuration information includes configuration information of a first-type reference signal, the downlink reference signal configuration information includes the configuration information of the first-type reference signal and configuration information of a second-type reference signal that the second base station needs to send to the second terminal; or the uplink reference signal configuration information includes configuration information of a first-type reference signal that the first terminal needs to send and configuration information of a second-type reference signal that the first terminal needs to send, and the downlink reference signal configuration information includes configuration information of a first-type reference signal that the first terminal needs to send to the first base station and configuration information of a second-type reference signal that the second terminal needs to send to the second base station. It may be learned that, the first base station specifies the uplink reference signal that the first terminal needs to send, and the second base station specifies a reference signal that needs to be measured by the second terminal, so that the second terminal can not only measure a downlink reference signal sent by the second base station to the second terminal, but also measure the uplink reference signal sent by the first terminal to the first base station, and further, interference, caused by the uplink signal sent by the first terminal to the first base station, to the downlink signal sent by the second base station to the second terminal may be determined based on a measurement result. Therefore, the base station can perform coordinated scheduling on the first terminal and the second terminal based on the measurement result to eliminate interference between the terminals.

In a possible design, when the uplink reference signal configuration information includes the configuration information of the first-type reference signal, a first-type reference signal to be measured by the second terminal is the first-type reference signal sent by the first terminal to a first base station, and the second-type reference signal to be measured by the second terminal is the second-type reference signal sent by the second base station to the second terminal; or when the uplink reference signal configuration information includes the configuration information of the first-type reference signal and the configuration information of the second-type reference signal that the first terminal needs to send, second-type reference signals to be measured by the second terminal include a second-type reference signal sent by the first terminal to the first base station and the second-type reference signal sent by the second base station to the second terminal.

In a possible design, the first-type reference signal is a sounding reference signal SRS, and the second-type reference signal is a channel state information-reference signal CSI-RS.

In a possible design, the second-type reference signal configuration information includes at least one of the following:
  resource information used to carry the second-type reference signal;
  an initialization parameter of the second-type reference signal;
  transmit power information of the second-type reference signal; and
  a configuration parameter used to generate the second-type reference signal.

In a possible design, the first-type reference signal configuration information includes at least one of the following:
  resource information used to carry the first-type reference signal;
  an initialization parameter of the first-type reference signal;
  transmit power information of the first-type reference signal; and
  a configuration parameter used to generate the first-type reference signal.

According to still another aspect, an embodiment of the present disclosure provides a reference signal transmission apparatus. The apparatus can implement a function performed by the base station in the foregoing method example. The function may be implemented by hardware, or may be implemented by hardware executing corresponding software. The hardware or the software includes one or more modules corresponding to the function.

In a possible design, a structure of the apparatus includes a processor and a transceiver. The processor is configured to support the apparatus in performing a corresponding function in the foregoing method. The transceiver is configured to support the apparatus in communicating with another network element. The apparatus may further include a memory. The memory is configured to be coupled to the processor, and stores a program instruction and data that are necessary to the apparatus. The one or more memories may be integrated with the processor, or may be separated from the processor. This is not limited in this application. The transceiver may be referred to as a transceiver unit, may be a transceiver circuit, or may be an input/output circuit or an interface.

According to still another aspect, an embodiment of the present disclosure provides a reference signal transmission apparatus. The apparatus can implement a function performed by the first terminal in the foregoing method example. The function may be implemented by hardware, or may be implemented by hardware executing corresponding software. The hardware or the software includes one or more modules corresponding to the function.

In a possible design, a structure of the apparatus includes a processor and a transceiver. The processor is configured to support the apparatus in performing a corresponding function in the foregoing method. The transceiver is configured to support the apparatus in communicating with another network element. The apparatus may further include a memory. The memory is configured to be coupled to the processor, and stores a program instruction and data that are necessary to the apparatus. The one or more memories may be integrated with the processor, or may be separated from the processor. This is not limited in this application. The transceiver may be referred to as a transceiver unit, may be a transceiver circuit, or may be an input/output circuit or an interface.

According to still another aspect, an embodiment of the present disclosure provides a reference signal transmission apparatus. The apparatus can implement a function performed by the second terminal in the foregoing method example. The function may be implemented by hardware, or may be implemented by hardware executing corresponding software. The hardware or the software includes one or more modules corresponding to the function.

In a possible design, a structure of the apparatus includes a processor and a transceiver. The processor is configured to support the apparatus in performing a corresponding function in the foregoing method. The transceiver is configured to support the apparatus in communicating with another network element. The apparatus may further include a memory. The memory is configured to be coupled to the processor, and stores a program instruction and data that are necessary to the apparatus. The one or more memories may be integrated with the processor, or may be separated from the processor. This is not limited in this application. The transceiver may be referred to as a transceiver unit, may be a transceiver circuit, or may be an input/output circuit or an interface.

According to still another aspect, an embodiment of the present disclosure provides a reference signal transmission apparatus. The apparatus can implement a function performed by one of the base station, the first terminal, and the second terminal in the foregoing method example. The function may be implemented by hardware, or may be implemented by hardware executing corresponding software. The hardware or the software includes one or more modules corresponding to the function. The apparatus includes one or more processors. The one or more processors are configured to support the base station, the first terminal, or the second terminal in implementing a corresponding function in the foregoing method. Further, the communications apparatus may include one or more memories. The memory is configured to couple with the processor, and stores a program and/or an instruction that are/is necessary for the communications apparatus, and may further store data. The one or more memories may be integrated with the processor, or may be separated from the processor. This is not limited in this application. When the program and/or the instruction are/is executed by the processor, the apparatus performs a function corresponding to the base station, the first terminal, or the second terminal in the foregoing method.

The foregoing one or more processors may be disposed in a centralized manner, or may be disposed separately. The foregoing one or more memories may be disposed in a centralized manner, or may be disposed separately. This is not limited herein.

According to still another aspect, an embodiment of the present disclosure provides a communications system, and the system includes the base station, the first terminal, and the second terminal that are described in the foregoing aspects.

According to yet another aspect, an embodiment of the present disclosure provides a computer storage medium, configured to store a computer software instruction used by the foregoing base station, and the computer storage medium includes a program designed for performing the foregoing aspects.

According to yet another aspect, an embodiment of the present disclosure provides a computer storage medium, configured to store a computer software instruction used by the foregoing first terminal, and the computer storage medium includes a program designed for performing the foregoing aspects.

According to yet another aspect, an embodiment of the present disclosure provides a computer storage medium, configured to store a computer software instruction used by the foregoing second terminal, and the computer storage medium includes a program designed for performing the foregoing aspects.

Compared with the prior art, in this solution, the second terminal may not only measure the downlink reference signal sent by the base station to the second terminal, but also measure the first-type reference signal sent by the first terminal to the base station or the second-type reference signal sent by the terminal to the base station, so that interference, caused by the uplink signal sent by the first terminal to the base station, to the downlink signal sent by the base station to the second terminal may be determined based on the measurement result. Therefore, the base station can perform coordinated scheduling on the first terminal and the second terminal based on the measurement result to eliminate interference between the terminals.

DESCRIPTION OF EMBODIMENTS

Figure 1:
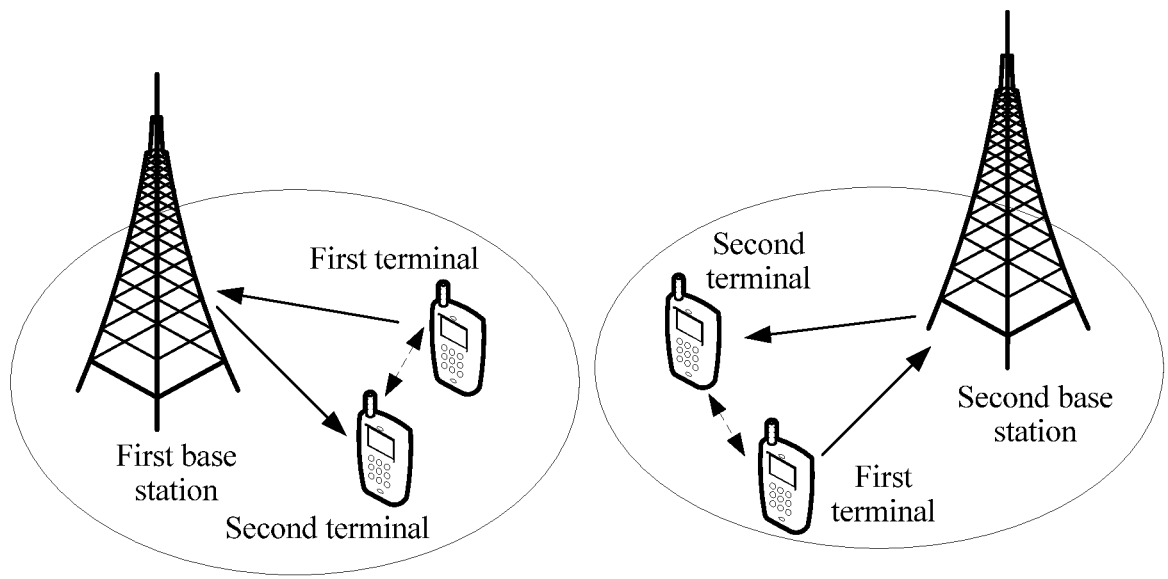
FIG. 1 is a schematic architectural diagram of a wireless communications system according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the following, some terms in this application are described, so as to help a person skilled in the art have a better understanding.

(1) A terminal, also referred to as user equipment (UE), is a device that provides a user with voice and/or data connectivity, for example, a handheld device or an in-vehicle device having a wireless connection function. Common terminals include, for example, a mobile phone, a tablet, a notebook computer, a palmtop computer, a mobile Internet device (MID), and a wearable device such as a smartwatch, a smart band, and a pedometer.

(2) A base station, also referred to as a radio access network (Radio Access Network, RAN) device, is a device that connects a terminal to a wireless network, including but is not limited to an evolved node B (eNB), a radio network controller (RNC), a node B (NB), a base station controller (BSC), a base transceiver station (BTS), a home eNodeB (for example, Home evolved NodeB or Home Node B, HNB), a baseband unit (BBU), and continuously evolved node B (gNB) in a future network such as a 5G network (for example, a network in which a new radio technology is applied). In addition, a Wi-Fi access point (AP), transmission & reception point (TRP), or the like may be included. For example, the base station may be the evolved Node B (eNB), the radio network controller (RNC), the Node B (NB), the base station controller (BSC), the base transceiver station (BTS), the home base station (for example, Home evolved NodeB, or Home Node B, HNB), the baseband unit (BBU), Wireless Fidelity (WIFI), an access point (AP), a transmission point (transmission and receiver point, TRP, or transmission point, TP), or the like. Alternatively, the base station may be a gNB in a 5G system such as new radio (NR), or a transmission point (TRP or TP). Alternatively, the base station may be a network node that constitutes the gNB or the transmission point, the baseband unit (BBU), a data unit (DU), or the like. In some deployments, the gNB may include a control unit (CU) and the DU. The gNB may further include a radio frequency unit (RU). The CU implements some functions of the gNB, and the DU implements some functions of the gNB. For example, the CU implements functions of an RRC (radio resource control) layer and a PDCP (packet data convergence protocol) layer, and the DU implements functions of an RLC (radio link control) layer, a MAC (Media Access Control) layer, and a PHY (physical) layer. RRC layer information finally becomes PHY layer information, or is changed from the PHY layer information. Therefore, in this architecture, higher layer signaling, such as RRC layer signaling or PHCP layer signaling, may also be sent by the DU, or sent by both the DU and the RU.

(3) In the specification and claims of the present disclosure, the terms "first", "second", and so on are intended to distinguish between different objects but do not indicate a particular order of the objects. For example, a first-type reference signal and a second-type reference signal are used to distinguish between different reference signals, and are not used to describe a particular order of the reference signals. In addition, a first terminal in the embodiments of the present disclosure refers to a terminal that needs to send an uplink signal to a terminal in a time period, and a second terminal refers to a terminal that needs to receive, in the time period, a downlink signal sent by the base station. It may be understood that, in different time periods, a terminal may be the first terminal or may be the second terminal. For example, in a time period, if a terminal A sends a signal to the base station, the terminal A is the first terminal in the time period; however, in another time period, if the terminal A receives a signal sent by the base station, the terminal A is the second terminal in the time period.

To eliminate interference, caused by the uplink signal sent by the terminal to the base station, to the downlink signal sent by the base station to the another terminal, the second terminal needs to separately measure signal quality of the uplink signal sent by the first terminal to the base station and signal quality of the downlink signal sent by the base station to the second terminal. In the prior art, the base station may instruct the second terminal to measure, within specific bandwidth, CSI-RSs (channel state information-reference signal) sent by different base stations, so as to obtain RSRP values of the CSI-RSs sent by different base stations. Alternatively, the base station may instruct the first terminal to send an SRS within specific bandwidth, so that the base station may measure an RSRP (reference signal receive power) value of the SRS (sounding reference signal) sent by the first terminal. However, because the second terminal can measure only a downlink reference signal sent by the base station to the second terminal, and cannot measure an uplink signal sent by the first terminal to the base station, in the prior art, the second terminal can only determine interference, caused by the downlink signal sent by the base station to the another terminal, to a downlink signal sent by the base station to the base station itself, and cannot determine the interference, caused by the uplink signal sent by the first terminal to the base station, to the downlink signal sent by the base station to the base station itself. Therefore, the interference, caused by the uplink signal sent by the first terminal to the base station, to the downlink signal sent by the base station to the second terminal cannot be eliminated by using an existing reference signal sounding method.

To resolve the foregoing problem, in the embodiments of the present disclosure, the base station may send configuration information of the SRS and configuration information of the CSI-RS to the first terminal, and send configuration information of a to-be-measured CSI-RS to the second terminal, where the to-be-measured CSI-RSs include both a CSI-RS sent by the first terminal to the base station and a CSI-RS sent by the base station to the second terminal. Therefore, the first terminal may send the SRS and the CSI-RS to the base station, and the second terminal may measure both the CSI-RS sent by the first terminal to the base station and the CSI-RS sent by the base station to the second terminal. Alternatively, the base station sends the configuration information of the SRS to the first terminal, and sends configuration information of a to-be-measured SRS and the configuration information of the to-be-measured CSI-RS to the second terminal, so that the second terminal can measure both an SRS sent by the first terminal to the base station and the CSI-RS sent by the base station to the second terminal. In this way, the second terminal can measure both the downlink signal sent by the base station to the second terminal and the uplink signal sent by the first terminal to the base station, so as to determine, based on a measurement result, interference, caused by the uplink signal sent by the first terminal to the base station, to the downlink signal sent by the base station to the second terminal, and further, the base station may coordinate interference between the terminals based on the measurement result.

The reference signal transmission method provided in the embodiments of the present disclosure may be applied to a wireless communications system. The wireless communications system may include one or more base stations and terminals served by these base stations. An embodiment of the present disclosure provides a schematic architectural diagram of a possible wireless communications system. As shown in FIG. 1, the system includes base stations, first terminals, and second terminals. In FIG. 1, two base stations, and the first terminals and the second terminals served by the base stations are shown as an example. Actually, each base station may serve a plurality of first terminals and a plurality of second terminals.

At a same time, the uplink signal sent by the first terminal to the base station causes interference to the downlink signal sent by the base station to the second terminal. Specifically, referring to FIG. 1, an uplink signal sent by the first terminal served by the base station causes interference to a downlink signal sent by the same base station to the second terminal. In addition, for two adjacent terminals at edges of coverage areas of a first base station and a second base station, an uplink signal sent by the first terminal served by the first base station to the first base station causes interference to a downlink signal sent by the second base station to the second terminal served by the second base station.

It should be noted that, in this embodiment of the present disclosure, the base station provides a service for the terminal by using a full duplex technology, that is, the base station may send and receive signals at a same time, for example, the base station may send a downlink signal to the second terminal and receive an uplink signal sent by the first terminal at the same time. The terminal may work in half duplex mode, that is, the terminal may send the uplink signal or receive the downlink signal, but cannot send the uplink signal and receive the downlink signal at the same time.

Figure 1A:
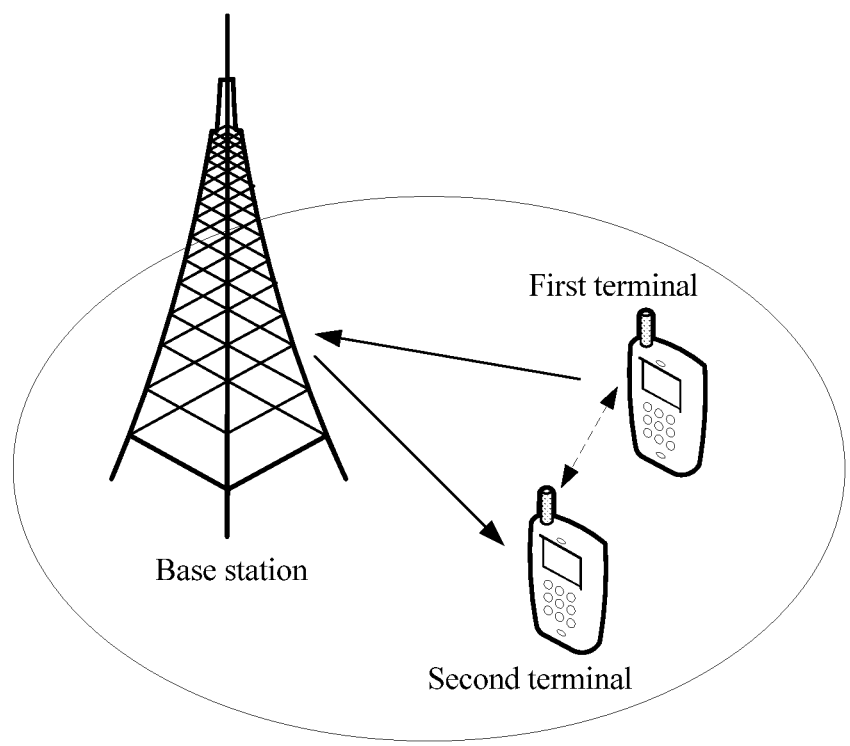
FIG. 1a is a schematic architectural diagram of another wireless communications system according to an embodiment of the present disclosure.
Figure 2:
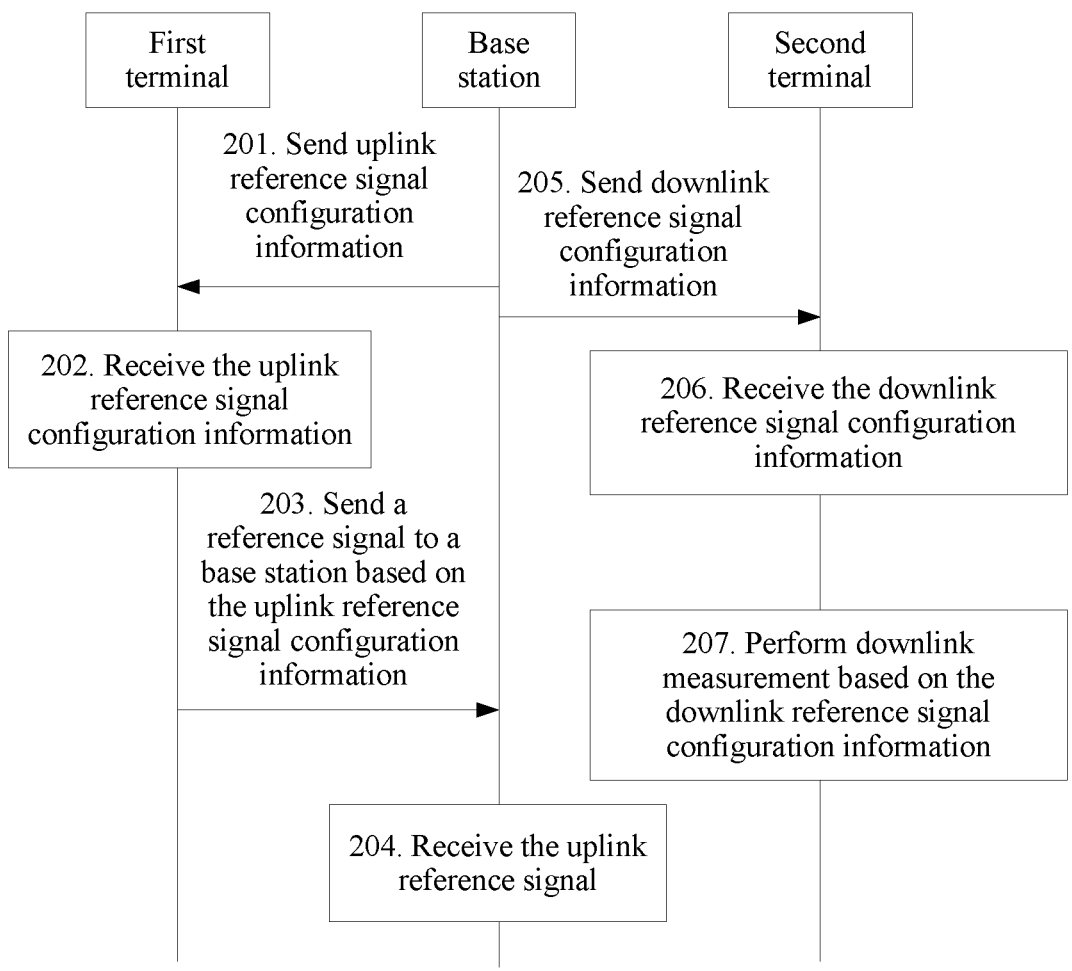
FIG. 2 is a flowchart of a reference signal transmission method according to an embodiment of the present disclosure.

To resolve a problem of mutual interference between terminals, this embodiment of the present disclosure provides a reference signal transmission method, which may be applied to a scenario shown in FIG. 1a, that is, signal measurement is performed for a first terminal and a second terminal served by a same base station, so as to resolve a problem of signal interference between the first terminal and the second terminal served by the same base station. As shown in FIG. 2, the method includes the following steps.

201. A base station sends uplink reference signal configuration information to a first terminal.

An uplink reference signal is a reference signal that the first terminal needs to send to the base station and that is used by the base station or another terminal to perform uplink measurement. The uplink reference signal includes only a first-type reference signal; or the uplink reference signals include the first-type reference signal and a second-type reference signal. The first-type reference signal is the reference signal that the first terminal needs to send to the base station and is generally used by the base station to measure uplink channel quality, for example, may be an SRS. In this embodiment of the present disclosure, the second terminal may also perform measurement on the first-type reference signal. In the prior art, the second-type reference signal is a downlink reference signal that the base station needs to send to the second terminal, for example, may be a CSI-RS or a CRS (cell-specific reference signal). In this embodiment of the present disclosure, to enable the second terminal to measure the uplink reference signal sent by the first terminal to the base station, it may be further specified that the first terminal sends the second-type reference signal, so as to implement that the second terminal performs measurement on the second-type reference signal sent by the first terminal. The following uses an example in which the first-type reference signal is the SRS and the second-type reference signal is the CSI-RS for description.

The uplink reference signal configuration information is used to instruct the first terminal to send the uplink reference signal, where the uplink reference signal configuration information includes configuration information of the first-type reference signal, or includes the configuration information of the first-type reference signal and configuration information of the second-type reference signal.

It should be noted that, the base station may send an RRC message to the first terminal, where the RRC message carries uplink reference signal configuration information, or the base station may send the uplink reference signal configuration information to the first terminal in another manner. This is not limited in this embodiment of the present disclosure.

202. The first terminal receives the uplink reference signal configuration information sent by the base station.

203. The first terminal sends an uplink reference signal to the base station based on the uplink reference signal configuration information.

It may be understood that, when the uplink reference signal configuration information includes configuration information of the SRS, the first terminal sends the SRS to the base station.

When the reference signal configuration information includes the configuration information of the SRS and configuration information of the CSI-RS, the first terminal sends the SRS and the CSI-RS to the base station.

204. The base station receives the uplink reference signal sent by the first terminal.

205. The base station sends downlink reference signal configuration information to a second terminal.

When the uplink reference signal configuration information includes the configuration information of the SRS, the downlink reference signal configuration information includes configuration information of an SRS to be measured by the second terminal and configuration information of a CSI-RS to be measured by the second terminal, where the SRS to be measured by the second terminal is the SRS sent by the first terminal to the base station, and the CSI-RS to be measured by the second terminal is a CSI-RS sent by the base station to the second terminal.

When the uplink reference signal configuration information includes configuration information of the SRS that the first terminal needs to send and configuration information of the CSI-RS that the first terminal needs to send, the downlink reference signal configuration information includes the configuration information of the CSI-RS to be measured by the second terminal, where the CSI-RSs to be measured by the second terminal include the CSI-RS sent by the first terminal to the base station and the CSI-RS sent by the base station to the second terminal.

206. The second terminal receives the downlink reference signal configuration information sent by the base station.

Figure 3:
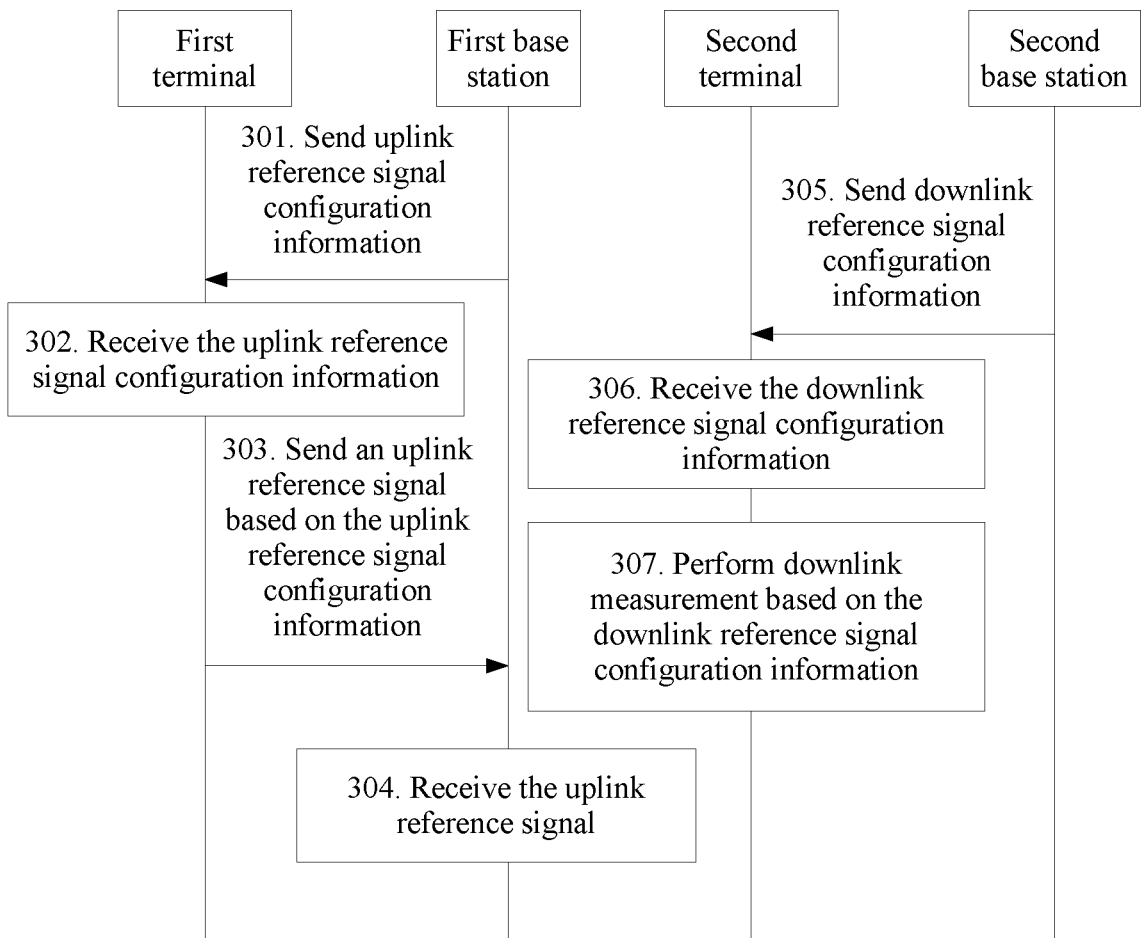
FIG. 3 is a flowchart of another reference signal transmission method according to an embodiment of the present disclosure.

It should be noted that, step 201 and step 205 may be performed at the same time, or may be performed in a specific order. This is not limited in this embodiment of the present disclosure. FIG. 3 shows only one possible execution sequence, and step 203 and step 207 need to be performed at the same time.

207. The second terminal performs downlink measurement based on the downlink reference signal configuration information.

It should be noted that, to eliminate interference, caused by the uplink signal sent by the first terminal to the base station, to the downlink signal sent by the base station to the second terminal, the second terminal needs to separately measure the uplink signal sent by the first terminal to the base station and the downlink signal sent by the base station to the second terminal. This embodiment of the present disclosure provides two measurement solutions.

In a first solution, when the downlink reference signal configuration information includes the configuration information of the SRS to be measured by the second terminal and the configuration information of the CSI-RS to be measured by the second terminal, the second terminal separately performs the downlink measurement on the SRS sent by the first terminal to the base station and the CSI-RS sent by the base station to the second terminal.

It may be understood that, in this case, the uplink signal measured by the second terminal is the SRS sent by the first terminal to the base station, and the downlink signal measured by the second terminal is the CSI-RS sent by the base station to the second terminal. Intensity of interference between the first terminal and the second terminal may be determined through measurement, and further, a measurement result may be reported to the base station, so that the base station performs coordinated scheduling on the first terminal and the second terminal to eliminate the interference between the first terminal and the second terminal.

In a second solution, when the downlink reference signal configuration information is the configuration information of the CSI-RS to be measured by the second terminal, the second terminal separately performs the downlink measurement on the CSI-RS sent by the first terminal to the base station and the CSI-RS sent by the base station to the second terminal.

It may be understood that, in this case, the uplink signal measured by the second terminal is the CSI-RS sent by the first terminal to the base station, and the downlink signal measured by the second terminal is the CSI-RS sent by the base station to the second terminal. The intensity of the interference between the first terminal and the second terminal may be determined through measurement, and further, the measurement result may be reported to the base station, so that the base station performs the coordinated scheduling on the first terminal and the second terminal to eliminate the interference between the first terminal and the second terminal.

It should be further noted that, the second terminal needs to separately measure each group of reference signals and separately report a measurement report of each group of reference signals. The foregoing second measurement solution is used as an example. The second terminal needs to separately measure two groups of sounding signals: the CSI-RSs sent by the first terminal this time to the base station and the CSI-RSs sent by the base station this time to the second terminal, and separately report the measurement results of these two groups of reference signals.

According to the reference signal transmission method provided in this embodiment of the present disclosure, the base station sends the uplink reference signal configuration information to the first terminal, so that the first terminal sends the uplink reference signal to the base station based on the uplink reference signal configuration information; and the base station further sends the downlink reference signal configuration information to the second terminal, so that the second terminal performs the downlink measurement based on the downlink reference signal configuration information. When the uplink reference signal configuration information is the configuration information of the first-type reference signal, the downlink reference signal configuration information includes the configuration information of the first-type reference signal and the configuration information of the second-type reference signal that the base station needs to send to the second terminal; or when the uplink reference signal configuration information includes the configuration information of the first-type reference signal and the configuration information of the second-type reference signal, the downlink reference signal configuration information includes the configuration information of the second-type reference signal that the base station needs to send to the second terminal and the configuration information of the second-type reference signal that the first terminal needs to send to the base station. Compared with the prior art, in this solution, the base station sends the downlink configuration information to the second terminal, so that the second terminal can not only measure the second-type reference signal sent by the base station to the second terminal, but also measure the first-type reference signal sent by the first terminal to the base station or the second-type reference signal sent by the first terminal to the base station; that is, the second terminal can measure the downlink reference signal sent by the base station to the second terminal, and can also measure the uplink reference signal sent by the first terminal to the base station, so that the base station can determine, based on the measurement result, the interference, caused by the uplink signal sent by the first terminal to the base station, to the downlink signal sent by the base station to the second terminal. Therefore, the base station can perform the coordinated scheduling on the first terminal and the second terminal based on the measurement result to eliminate the interference between terminals.

Figure 1B:
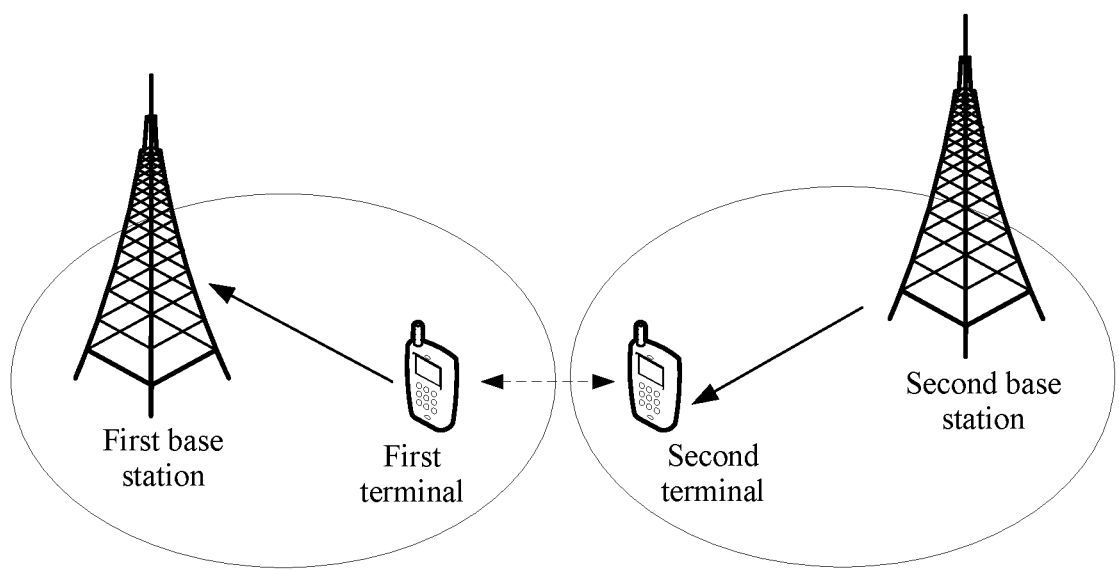
FIG. 1b is a schematic architectural diagram of another wireless communications system according to an embodiment of the present disclosure.

The reference signal transmission method provided in this embodiment of the present disclosure may be further applied to a scenario shown in FIG. 1b, that is, signal measurement is performed for a first terminal served by a first base station and a second terminal served by a second base station, so as to resolve a problem that an uplink signal sent by the first terminal to the first base station causes interference to a downlink signal sent by the second base station to the second terminal. As shown in FIG. 3, the method includes the following steps.

301. A first base station sends uplink reference signal configuration information to a first terminal served by the first base station.

An uplink reference signal is a reference signal that the first terminal needs to send to the first base station. For details, refer to the related description of the uplink reference signal in the foregoing step 201. Details are not described herein again.

The uplink reference signal configuration information is used to instruct the first terminal to send the uplink reference signal configuration information to the first base station. The uplink reference signal configuration information includes configuration information of a first-type reference signal; or the uplink reference signal configuration information includes the configuration information of the first-type reference signal and configuration information of a second-type reference signal.

302. The first terminal receives the uplink reference signal configuration information sent by the first base station.

303. The first terminal sends an uplink reference signal to the first base station based on the uplink reference signal configuration information.

It may be understood that, when the uplink reference signal configuration information includes configuration information of an SRS, the first terminal sends the SRS to the first base station.

When the reference signal configuration information includes the configuration information of the SRS and configuration information of a CSI-RS, the first terminal sends the SRS and the CSI-RS to the first base station.

304. The first base station receives the uplink reference signal sent by the first terminal.

305. A second base station sends downlink reference signal configuration information to a second terminal.

It should be noted that, the first base station may share the uplink reference signal configuration information with the second base station by using an interface between the base stations, so that the second base station can generate the downlink reference signal configuration information based on the uplink reference signal configuration information of the first base station.

When the uplink reference signal configuration information includes the configuration information of the SRS, the downlink reference signal configuration information includes configuration information of an SRS to be measured by the second terminal and configuration information of a CSI-RS to be measured by the second terminal, where the SRS to be measured by the second terminal is the SRS sent by the first terminal to the first base station, and the CSI-RS to be measured by the second terminal is a CSI-RS sent by the second base station to the second terminal.

When the uplink reference signal configuration information includes configuration information of the SRS that the first terminal needs to send and configuration information of the CSI-RS that the first terminal needs to send, the downlink reference signal configuration information is the configuration information of the CSI-RS to be measured by the second terminal, where the CSI-RSs to be measured by the second terminal include the CSI-RS sent by the first terminal to the first base station and the CSI-RS sent by the second base station to the second terminal.

306. The second terminal receives the downlink reference signal configuration information sent by the second base station.

It should be noted that, step 301 and step 305 may be performed at the same time, or may be performed in a specific order. This is not limited in this embodiment of the present disclosure. FIG. 3 shows only one possible execution sequence, and step 303 and step 307 need to be performed at the same time.

307. The second terminal performs downlink measurement based on the downlink reference signal configuration information.

It should be noted that, to eliminate interference, caused by the uplink signal sent by the first terminal to the first base station, to the downlink signal sent by the second base station to the second terminal, the second terminal needs to separately measure the uplink signal sent by the first terminal to the first base station and the downlink signal sent by the second base station to the second terminal. This embodiment of the present disclosure provides two measurement solutions.

In a first solution, when the downlink reference signal configuration information includes the configuration information of the SRS to be measured by the second terminal and the configuration information of the CSI-RS to be measured by the second terminal, the second terminal separately performs the downlink measurement on the SRS sent by the first terminal to the first base station and the CSI-RS sent by the second base station to the second terminal.

It may be understood that, in this case, the uplink signal measured by the second terminal is the SRS sent by the first terminal to the first base station, and the downlink signal measured by the second terminal is the CSI-RS sent by the second base station to the second terminal. Intensity of interference between the first terminal and the second terminal may be determined through measurement, and further, a measurement result may be reported to the second base station, so that the second base station performs coordinated scheduling on the first terminal and the second terminal to eliminate interference between the first terminal and the second terminal.

In a second solution, when the downlink reference signal configuration information is the configuration information of the CSI-RS to be measured by the second terminal, the second terminal separately performs the downlink measurement on the CSI-RS sent by the first terminal to the first base station and the CSI-RS sent by the second base station to the second terminal.

It may be understood that, in this case, the uplink signal measured by the second terminal is the CSI-RS sent by the first terminal to the first base station, and the downlink signal measured by the second terminal is the CSI-RS sent by the second base station to the second terminal. The intensity of the interference between the first terminal and the second terminal may be determined through measurement, and further, the measurement result may be reported to the second base station, so that the second base station performs the coordinated scheduling on the first terminal and the second terminal to eliminate the interference between the first terminal and the second terminal.

It should be further noted that, the second terminal needs to separately measure and report reference signals of different groups.

According to the reference signal transmission method provided in this embodiment of the present disclosure, the first base station sends the uplink reference signal configuration information to the first terminal, so that the first terminal sends the uplink reference signal to the first base station based on the uplink reference signal configuration information; and the second base station further sends the downlink reference signal configuration information to the second terminal, so that the second terminal performs the downlink measurement based on the downlink reference signal configuration information. When the uplink reference signal configuration information is the configuration information of the first-type reference signal, the downlink reference signal configuration information includes configuration information of a first-type reference signal to be measured by the second terminal and configuration information of a second-type reference signal that the second base station needs to send to the second terminal; or when the uplink reference signal configuration information includes the configuration information of the first-type reference signal and configuration information of a second-type reference signal that the first terminal needs to send, and the downlink reference signal configuration information is configuration information of a second-type reference signal that the first terminal needs to send to the first base station and configuration information of a second-type reference signal that the second base station needs to send to the second terminal. Compared with the prior art, in this solution, the second terminal can not only measure the second-type reference signal sent by the second base station to the second terminal, but also measure the first-type reference signal sent by the first terminal to the first base station or the second-type reference signal sent by the first terminal to the first base station; that is, the second terminal can measure the downlink reference signal sent by the second base station to the second terminal, and can also measure the uplink reference signal sent by the first terminal to the first base station, so that, based on the measurement result, the interference, caused by the uplink signal sent by the first terminal to the first base station, to the downlink signal sent by the second base station to the second terminal can be determined. Therefore, the base station can perform the coordinated scheduling on the first terminal and the second terminal based on the measurement result to eliminate the interference between terminals.

The following describes the uplink reference signal configuration information and the downlink reference signal configuration information in the foregoing embodiment.

The configuration information of the first-type reference signal in the uplink reference signal configuration information is the configuration information of the SRS that the first terminal needs to send to the base station. The configuration information is basically consistent with that in the prior art, and details are not described herein.

The configuration information of the second-type reference signal in the uplink reference signal configuration information is the configuration information of the CSI-RS that the first terminal needs to send to the base station, and the configuration information includes at least one of the following:

(1) Resource Information Used to Carry the Second-Type Reference Signal

The resource information used to carry the second-type reference signal includes at least one of the following: time domain resource information, frequency domain resource information, beam domain resource information, port domain resource information, code domain resource information, or time-frequency pattern domain resource information.

The time domain resource information is at least one of a subframe number and a symbol number.

The frequency domain resource information is at least one of a start frequency domain unit resource number, a frequency domain width, and frequency domain comb indication information.

Figure 4:
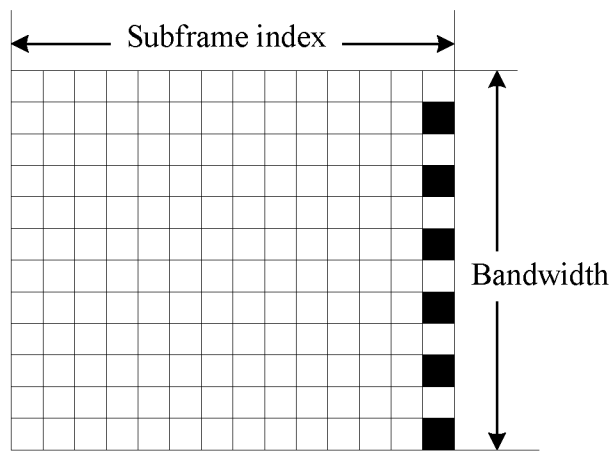
FIG. 4 is an example schematic diagram of time-frequency resource information according to an embodiment of the present disclosure.

The frequency domain unit resource may be a frequency domain resource block RB or a frequency domain sub-band. For example, as shown in FIG. 4, a resource block at which a black square is located is the frequency domain resource information used to carry the second-type reference signal.

The port domain resource information is antenna port information of the second-type reference signal.

Figure 5:
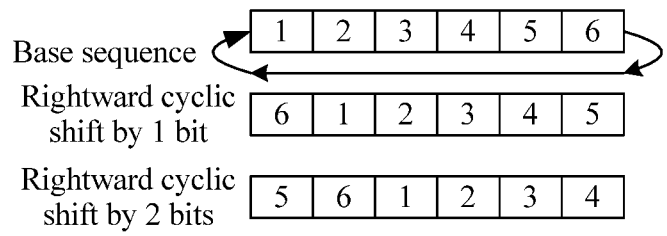
FIG. 5 is an example schematic diagram of a sequence cyclic shift method in a reference signal transmission method according to an embodiment of the present disclosure.

The code domain resource information is at least one of spread spectrum sequence information and a sequence cyclic shift value. As shown in FIG. 5, a base sequence represents a reference signal generation sequence. When the sequence cyclic shift value is 1, a generation sequence of the second-type reference signal is a sequence obtained by performing a rightward cyclic shift by 1 bit based on the base sequence. When the sequence cyclic shift value is 2, the generation sequence of the second-type reference signal is a sequence obtained by performing the rightward cyclic shift by 2 bits based on the base sequence.

Figure 6:
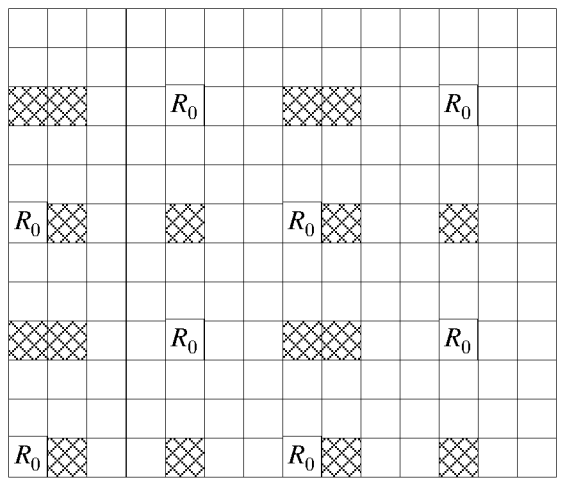
FIG. 6 is an example schematic diagram of time-frequency pattern resource information according to an embodiment of the present disclosure.
Figure 6:
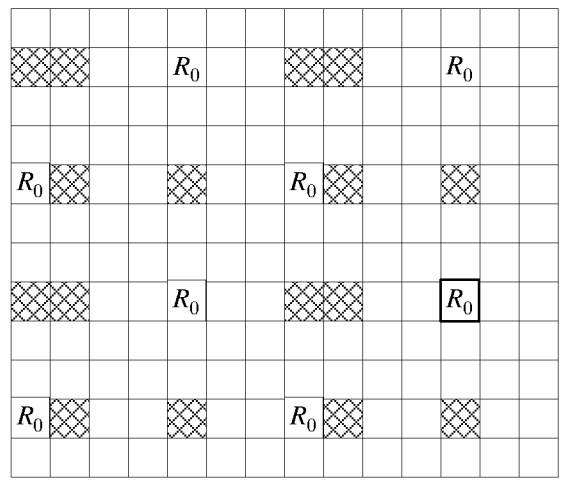

The time-frequency pattern resource information is used to indicate a time-frequency resource that is in a physical resource block and that carries the second-type reference signal. As shown in FIG. 6, a time-frequency pattern 1 and a time-frequency pattern 2 each represent a group of time-frequency resources that are used to carry the second-type reference signal. The first terminal may send the second-type reference signal by using the non-blank resource block in FIG. 6.

(2) An Initialization Parameter of the Second-Type Reference Signal

The initialization parameter includes at least one of the following: a cell index number, a virtual cell index number, a time domain index number, and a frequency domain index number.

(3) Transmit Power Information of the Second-Type Reference Signal

The transmit power information of the second-type reference signal is an absolute value of transmit power of the second-type reference signal, or a ratio of the transmit power of the second-type reference signal to transmit power of a downlink data channel.

It may be understood that, the first terminal needs to send the second-type reference signal based on transmit power specified in the transmit power information.

(4) A Configuration Parameter Used to Generate the Second-Type Reference Signal

The second-type reference signal may be generated based on the configuration parameter and a sequence generation formula used to generate the second-type reference signal.

In addition, the configuration information of the first-type reference signal that is to be measured by the second terminal and that is in the downlink reference signal configuration information is the configuration information of the SRS that the first terminal to be measured by the second terminal needs to send to the base station, and the configuration information includes at least one of the following:

(1) Resource Information Used to Carry the First-Type Reference Signal

The resource information used to carry the first-type reference signal includes at least one of the following: time domain resource information, frequency domain resource information, beam domain resource information, port domain resource information, code domain resource information, or time-frequency pattern domain resource information.

The time domain resource information is at least one of a subframe number and a symbol number.

The frequency domain resource information is at least one of a start frequency domain unit resource number, a frequency domain width, and frequency domain comb indication information.

The port domain resource information is antenna port information of the first-type reference signal.

The code domain resource information is at least one of spread spectrum sequence information and a sequence cyclic shift value of the first-type reference signal.

The time-frequency pattern resource information is used to indicate a resource that is in a physical resource block and that carries the first-type reference signal.

(2) An Initialization Parameter of the First-Type Reference Signal

The initialization parameter includes at least one of the following: a cell index number, a virtual cell index number, a time domain index number, and a frequency domain index number.

(3) Transmit Power Information of the First-Type Reference Signal

The transmit power information of the first-type reference signal is an absolute value of transmit power of the first-type reference signal, or a ratio of the transmit power of the first-type reference signal to transmit power of a downlink data channel.

(4) A Configuration Parameter Used to Generate the First-Type Reference Signal

The first-type reference signal may be generated based on the configuration parameter and a sequence generation formula used to generate the first-type reference signal.

In addition, the configuration information of the second-type reference signal that is to be measured by the second terminal and that is in the downlink reference signal configuration information refers to the configuration information of the CSI-RS sent by the first terminal to be measured by the second terminal to the base station, or the configuration information of the CSI-RS sent by the base station to the second terminal.

In this embodiment of the present disclosure, the base station separately sends the uplink reference signal configuration information to the first terminal, and sends the downlink reference signal configuration information to the second terminal, so that the second terminal can separately measure, based on the downlink reference signal configuration information, the uplink signal sent by the first terminal to the base station and the downlink signal sent by the base station to the second terminal, and further determine the interference, caused by the uplink signal sent by the first terminal to the base station, to the downlink signal sent by the base station to the second terminal. Therefore, the base station can perform the coordinated scheduling on the first terminal and the second terminal based on a measurement result to eliminate the interference between the first terminal and the second terminal.

The foregoing has mainly described the solutions provided in the embodiments of the present disclosure from the perspective of interaction between network elements. It may be understood that, to implement the foregoing functions, each network element such as the base station, the first terminal, or the second terminal includes a corresponding hardware structure and/or software module for implementing each function of the network element. A person of ordinary skill in the art should be easily aware that, in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, the base station, the first terminal, or the second terminal may be divided into function modules based on the foregoing method examples. For example, each function module may be obtained through division based on a corresponding function, or two or more functions may be integrated into one processing module. The integrated module may be implemented in a form of hardware, or may be implemented in a form of a software functional module. It should be noted that the module division in the embodiments of the present disclosure is an example, and is merely logical function division. There may be another division manner in an actual implementation.

Figure 7:
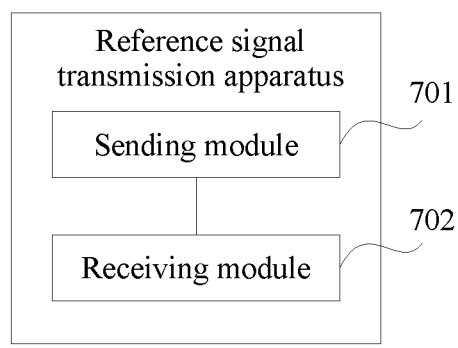
FIG. 7 is a schematic diagram of a logical structure of a reference signal transmission apparatus according to an embodiment of the present disclosure.

An embodiment of the present disclosure further provides a reference signal transmission apparatus, where the apparatus may be the base station in the foregoing embodiments. FIG. 7 is a possible schematic structural diagram of an apparatus used in the foregoing embodiments, such as the base station. The apparatus includes a sending module 701 and a receiving module 702. The sending module 701 is configured to support the base station in performing step 201 and step 205 in FIG. 2. The receiving module 702 is configured to support the base station in performing step 204 in FIG. 2.

It should be noted that, the base station in FIG. 7 may be configured to indicate a first base station, or may be configured to indicate a second base station. When the base station in FIG. 7 is configured to indicate the first base station, the sending module 701 is configured to support the first base station in performing step 301 in FIG. 3, and the receiving module 702 is used to support the first base station in performing step 304 in FIG. 3. When the base station in FIG. 7 is configured to indicate the second base station, the sending module 701 is configured to support the second base station in performing step 305 in FIG. 3. All related content of steps in the foregoing method embodiments may be cited in function descriptions of corresponding functional modules, and details are not described herein again.

Figure 8:
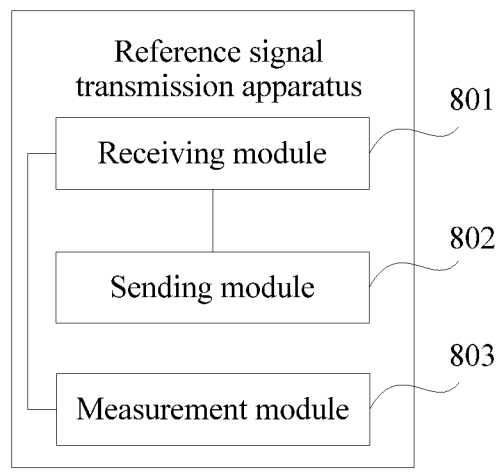
FIG. 8 is a schematic diagram of a logical structure of another reference signal transmission apparatus according to an embodiment of the present disclosure.

An embodiment of the present disclosure further provides a reference signal transmission apparatus, where the apparatus may be the terminal in the foregoing embodiments. FIG. 8 is a possible schematic structural diagram of an apparatus used in the foregoing embodiments, such as the terminal. It should be noted that, in different time periods, a terminal may be a first terminal or may be a second terminal. Therefore, in this embodiment of the present disclosure, structures of the first terminal and the second terminal are the same, but function modules used in different time periods are different. The apparatus includes a receiving module 801, a sending module 802, and a measurement module 803.

When the apparatus shown in FIG. 8 is implemented as the first terminal, the receiving module 801 is configured to control the first terminal to perform step 202 in FIG. 2 and step 302 in FIG. 3, and the sending module 802 is configured to control the first terminal to perform step 203 in FIG. 2 and step 303 in FIG. 3.

When the apparatus shown in FIG. 8 is implemented as the second terminal, the receiving module 801 is configured to control the second terminal to perform step 206 in FIG. 2 and step 306 in FIG. 3, and the measurement module 803 is configured to control the second terminal to perform step 207 in FIG. 2 and step 307 in FIG. 3. All related content of steps in the foregoing method embodiments may be cited in function descriptions of corresponding functional modules, and details are not described herein again.

Figure 9:
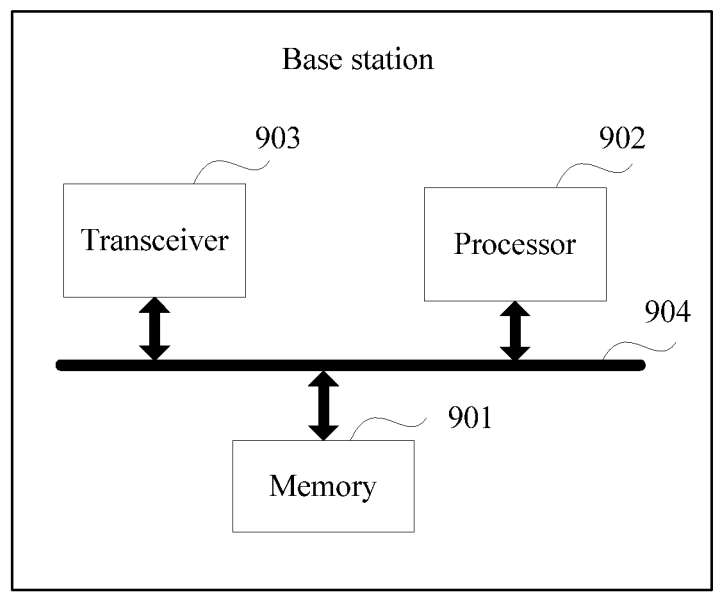
FIG. 9 is a schematic diagram of a logical structure of a base station according to an embodiment of the present disclosure.

FIG. 9 is a possible schematic structural diagram of a base station used in the foregoing embodiment. The base station in FIG. 9 may be configured to indicate a first base station, or may be configured to indicate a second base station. The base station includes a processor 902, a transceiver 903, a memory 901, and a bus 904. The memory 901 may be integrated into the processor 902, or may be separated from the processor 902. The transceiver 903, the processor 902, and the memory 901 are interconnected by using the bus 904. The bus 904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus. The processor 902 is configured to control and manage an action of the base station. For example, the processor 902 is configured to support the base station in performing coordinated scheduling on the first terminal and the second terminal based on a measurement result of the second terminal. The transceiver 903 is configured to support the base station in communicating with another network entity, for example, with the function module or the network entity shown in FIG. 1, FIG. 1a, FIG. 8, or FIG. 10. The memory 901 is configured to store program code and data of the base station.

Figure 10:
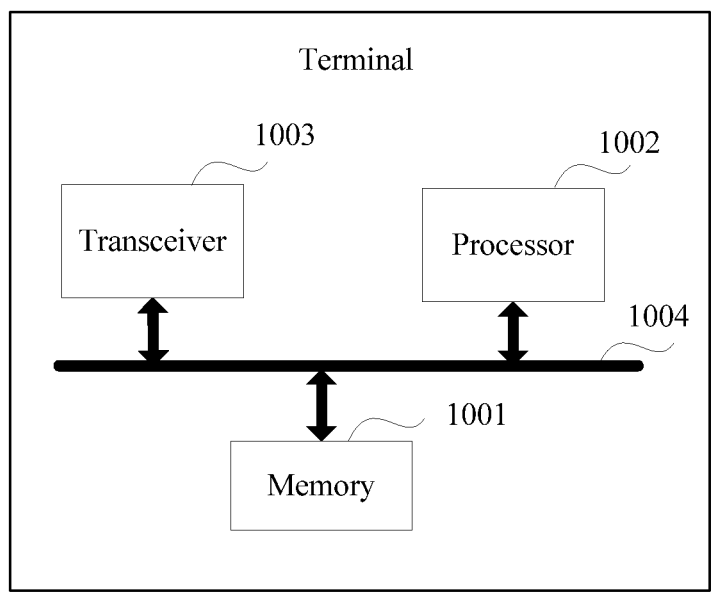
FIG. 10 is a schematic diagram of a logical structure of a terminal according to an embodiment of the present disclosure.

FIG. 10 is a possible schematic structural diagram of a terminal used in the foregoing embodiments. The terminal shown in FIG. 10 may be configured to indicate a first terminal, or may be configured to indicate a second terminal. The terminal includes a processor 1002, a transceiver 1003, a memory 1001, and a bus 1004. The memory 1001 may be integrated into the processor 1002, or may be separated from the processor 1002. The transceiver 1003, the processor 1002, and the memory 1001 are interconnected by using the bus 1004. The bus 1004 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 10, but this does not mean that there is only one bus or only one type of bus. The processor 1002 is configured to control and manage an action of the terminal. For example, the processor 1002 is configured to support the terminal in performing step 207 in FIG. 2 and step 307 in FIG. 3. The transceiver 903 is configured to support the terminal in communicating with another network entity, for example, with the function module or the network entity shown in FIG. 1, FIG. 1a, FIG. 7, or FIG. 9. The memory 901 is configured to store program code and data of the terminal.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include a magnetic disc, an optical disc, a read-only memory (ROM), or a random access memory (RAM).

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A reference signal transmission method, comprising:
sending uplink reference signal configuration information to a first terminal;
receiving an uplink reference signal from the first terminal based on the uplink reference signal configuration information; and
sending downlink reference signal configuration information to a second terminal,
wherein the uplink reference signal configuration information comprises configuration information of a sounding reference signal (SRS) and configuration information of a channel state information reference signal (CSI-RS), and wherein the configuration information of the CSI-RS includes code domain information that includes a sequence cyclic shift value, and wherein in response to the sequence shift value equaling 1, a generation sequence of the CSI-RS is a sequence obtained by performing a rightward cyclic shift by 1 bit based on the base sequence, and wherein in response to the sequence cyclic shift value equaling 2, the generation sequence of the CSI-RS is a sequence obtained by performing the rightward cyclic shift by 2 bits based on the base sequence, and wherein the downlink reference signal configuration information comprises configuration information of a to-be-measured CSI-RS, and wherein the to-be-measured CSI-RS includes both a CSI-RS sent by the first terminal to a base station and a CSI-RS sent by the base station to the second terminal, and
receiving a measurement report from the second terminal.

2. The reference signal transmission method according to claim 1, wherein the configuration information of the CSI-RS comprises at least one of the following:
resource information used to carry the CSI-RS;
an initialization parameter of the CSI-RS;
a transmit power information of the CSI-RS; and
a configuration parameter used to generate the CSI-RS.

3. The reference signal transmission method according to claim 1, wherein the configuration information of the SRS comprises at least one of the following:
resource information used to carry the SRS;
an initialization parameter of the SRS;
a transmit power information of the SRS; and
a configuration parameter used to generate the SRS.

4. A reference signal transmission method, comprising:
receiving, by a first terminal, uplink reference signal configuration information from a base station, wherein the uplink reference signal configuration information comprises configuration information of a sounding reference signal (SRS) and configuration information of a channel state information reference signal (CSI-RS) that the first terminal needs to send, and wherein the configuration information of the CSI-RS includes code domain information that includes a sequence cyclic shift value, and wherein in response to the sequence shift value equaling 1, a generation sequence of the CSI-RS is a sequence obtained by performing a rightward cyclic shift by 1 bit based on the base sequence, and wherein in response to the sequence cyclic shift value equaling 2, the generation sequence of the CSI-RS is a sequence obtained by performing the rightward cyclic shift by 2 bits based on the base sequence; and sending, by the first terminal, the SRS and the CSI-RS signal to the base station based on the uplink reference signal configuration information, wherein the downlink reference signal configuration information comprises configuration information of a to-be-measured CSI-RS, and wherein the to-be-measured CSI-RS includes both a CSI-RS sent by the first terminal to the base station and a CSI-RS sent by the base station to the second terminal.

5. The reference signal transmission method according to claim 4, wherein the configuration information of the CSI-RS comprises at least one of the following:
resource information used to carry the CSI-RS;
an initialization parameter of the CSI-RS;
a transmit power information of the CSI-RS; and
a configuration parameter used to generate the CSI-RS.

6. A reference signal transmission method, comprising:
receiving, by a second terminal, downlink reference signal configuration information from a base station, wherein the downlink reference signal configuration information comprises configuration information of a to-be-measured channel state information reference signal (CSI-RS), wherein the to-be-measured CSI-RS includes both a CSI-RS sent by a first terminal to the base station and a CSI-RS sent by the base station to the second terminal, and wherein the configuration information of the CSI-RS includes code domain information that includes a sequence cyclic shift value, and wherein in response to the sequence shift value equaling 1, a generation sequence of the CSI-RS is a sequence obtained by performing a rightward cyclic shift by 1 bit based on the base sequence, and wherein in response to the sequence cyclic shift value equaling 2, the generation sequence of the CSI-RS is a sequence obtained by performing the rightward cyclic shift by 2 bits based on the base sequence;

performing, by the second terminal, downlink measurement based on the downlink reference signal configuration information; and reporting, by the second terminal, a measurement result to the base station.

7. The reference signal transmission method according to claim 6, wherein the performing, by the second terminal, downlink measurement based on the downlink reference signal configuration information comprises:

separately performing, by the second terminal, the downlink measurement on the CSI-RS sent by the first terminal and the CSI-RS sent by the base station to the second terminal.

8. A reference signal transmission apparatus, wherein the apparatus is used for a base station, and the apparatus comprises:
a transmitter, configured to send uplink reference signal configuration information to a first terminal;
a receiver, configured to receive an uplink reference signal from the first terminal based on the uplink reference signal configuration information,
wherein the transmitter is further configured to send downlink reference signal configuration information to a second terminal,
wherein the uplink reference signal configuration information comprises configuration information of a sounding reference signal (SRS) and configuration information of a channel state information reference signal (CSI-RS), and wherein the configuration information of the CSI-RS includes code domain information that includes a sequence cyclic shift value, and wherein in response to the sequence shift value equaling 1, a generation sequence of the CSI-RS is a sequence obtained by performing a rightward cyclic shift by 1 bit based on the base sequence, and wherein in response to the sequence cyclic shift value equaling 2, the generation sequence of the CSI-RS is a sequence obtained by performing the rightward cyclic shift by 2 bits based on the base sequence, and, wherein the downlink reference signal configuration information comprises configuration information of a to-be-measured CSI-RS, and wherein the to-be-measured CSI-RS includes both a CSI-RS sent by the first terminal to the base station and a CSI-RS sent by the base station to the second terminal, and
wherein the receiver is further configured to receive a measurement report from the second terminal.

9. The reference signal transmission apparatus according to claim 8, wherein the configuration information of the CSI-RS comprises at least one of the following:
resource information used to carry the CSI-RS;
an initialization parameter of the CSI-RS;
a transmit power information of the CSI-RS; and
a configuration parameter used to generate the CSI-RS.

10. The reference signal transmission apparatus according to claim 8, wherein the configuration information of the SRS comprises at least one of the following:
resource information used to carry the SRS;
an initialization parameter of the SRS;
a transmit power information of the SRS; and
a configuration parameter used to generate the SRS.

11. A reference signal transmission apparatus, wherein the apparatus is used for a first terminal, and the apparatus comprises:
a receiver, configured to receive uplink reference signal configuration information from a base station, wherein the uplink reference signal configuration information comprises configuration information of a sounding reference signal (SRS) and configuration information of a channel state information reference signal (CSI-RS) that the first terminal needs to send, and wherein the configuration information of the CSI-RS includes code domain information that includes a sequence cyclic shift value, and wherein in response to the sequence shift value equaling 1, a generation sequence of the CSI-RS is a sequence obtained by performing a rightward cyclic shift by 1 bit based on the base sequence, and wherein in response to the sequence cyclic shift value equaling 2, the generation sequence of the CSI-RS is a sequence obtained by performing the rightward cyclic shift by 2 bits based on the base sequence; and a transmitter, configured to send the SRS and the CSI-RS to the base station based on the uplink reference signal configuration information, wherein the downlink reference signal configuration information comprises configuration information of a to-be-measured CSI-RS, and wherein the to-be-measured CSI-RS includes both a CSI-RS sent by the first terminal to the base station and a CSI-RS sent by the base station to the second terminal.

12. The reference signal transmission apparatus according to claim 11, wherein the configuration information of the CSI-RS comprises at least one of the following:

resource information used to carry the CSI-RS;

an initialization parameter of the CSI-RS;

a transmit power information of the CSI-RS; and a configuration parameter used to generate the CSI-RS.

13. A reference signal transmission apparatus, wherein the apparatus is used for a second terminal, and the apparatus comprises:

a receiver, configured to receive downlink reference signal configuration information from a base station, wherein the downlink reference signal configuration information comprises configuration information of a to-be-measured channel state information reference signal (CSI-RS), wherein the to-be-measured CSI-RS includes both a CSI-RS sent by a first terminal to the base station and a CSI-RS sent by the base station to the second terminal, and wherein the configuration information of the CSI-RS includes code domain information that includes a sequence cyclic shift value, and wherein in response to the sequence shift value equaling 1, a generation sequence of the CSI-RS is a sequence obtained by performing a rightward cyclic shift by 1 bit based on the base sequence, and wherein in response to the sequence cyclic shift value equaling 2, the generation sequence of the CSI-RS is a sequence obtained by performing the rightward cyclic shift by 2 bits based on the base sequence;

a processor, configured to perform downlink measurement based on the downlink reference signal configuration information; and a transmitter, configured to report a measurement result to the base station.

14. The reference signal transmission apparatus according to claim 13, wherein:

the processor is further configured to separately perform the downlink measurement on the CSI-RS sent by the first terminal and the CSI-RS sent by the base station to the second terminal.

* * * * *